United States Patent Office 3,041,490
Patented June 26, 1962

3,041,490
ELECTROLUMINESCENT APPARATUS
Jan A. Rajchman and George R. Briggs, Princeton, N.J., assignors to Radio Corporation of America, a corporation of Delaware
Original application May 31, 1955, Ser. No. 511,953, now Patent No. 2,904,626, dated Sept. 15, 1959. Divided and this application Dec. 17, 1958, Ser. No. 781,141
6 Claims. (Cl. 313—108)

The present invention relates to electrical display and in particular to novel means for controlling the light information displayed by an electroluminescent device.

This application is a divisional application of applicants' copending application, Serial No. 511,953 filed May 31, 1955, now Patent 2,904,626 issued September 15, 1959.

The electrical display device according to the present invention employs a novel arrangement including a matrix or array of elemental light emitting areas and includes a unique means at each elemental light emitting area for selecting image or pattern information relating to that elemental area, storing that information and controlling the light output of the corresponding light emitting area in accordance with that information. An electrical display device according to the present invention will be referred to hereinafter as a mural image reproducer, or as an image reproducer.

Elemental area selection, information, storage and luminosity control is provided by the use of ferroelectric switching and storage devices which are a member of the broad class of devices termed transhysteretic devices of which another member, the transfluxor—a ferro-magnetic device—has been described in detail in the copending application entitled "An Electrical Display Device" bearing the U.S. Serial No. 511,848, by J. A. Rajchman, now Patent 2,928,894 issued March 15, 1960.

A transhysteretic device is a device constituting an aggregate of materials having a plurality of distinct paths, each of which may be saturated at remanence and adjusted between each of two stages of saturation corresponding to each extremity of a hysteresis loop. A driving force or forces applied to one or more of the paths may be utilized to control the apparent characteristics of the hysteresis loop characterizing that path or paths to provide control of power coupled to an external load through one or more of the paths. In a ferroelectric transhysteretic device, hereinafter referred to as a transcharger, hysteresis-loop relationships exist between the remanent charge and the coercive voltage. As will be shown in more detail in the specification to follow, a transcharger may be utilized to store an input signal and control the transmission of electrical power in accordance with a stored signal. Transchargers have the ability to also select information signals.

An object of this invention is to provide an improved electrical display device.

Another object of this invention is to provide electroluminescent apparatus utilizing ferroelectric switching, storage, and control.

According to the invention, a ferroelectric device is associated with each elemental luminescent area of an electrical display device. Each ferroelectric device controls the light output of the corresponding luminescent elemental area so that the overall image display device will store and reproduce a visible image in accordance with an applied information signal.

In one form of the present invention, ferroelectric devices may be utilized for controlling the light output of electroluminescent elemental areas. Moreover, a color image may be reproduced by a mural image reproducer according to the present invention by subdividing each elemental light emitting area into groups of subelemental light emitting areas, each emitting a suitable primary color and energized according to the signal related to the light output corresponding to that primary color at that elemental light emitting area.

Other and incidental objects of this invention will become apparent upon a reading of the specification and a study of the drawings wherein:

Figure 1:
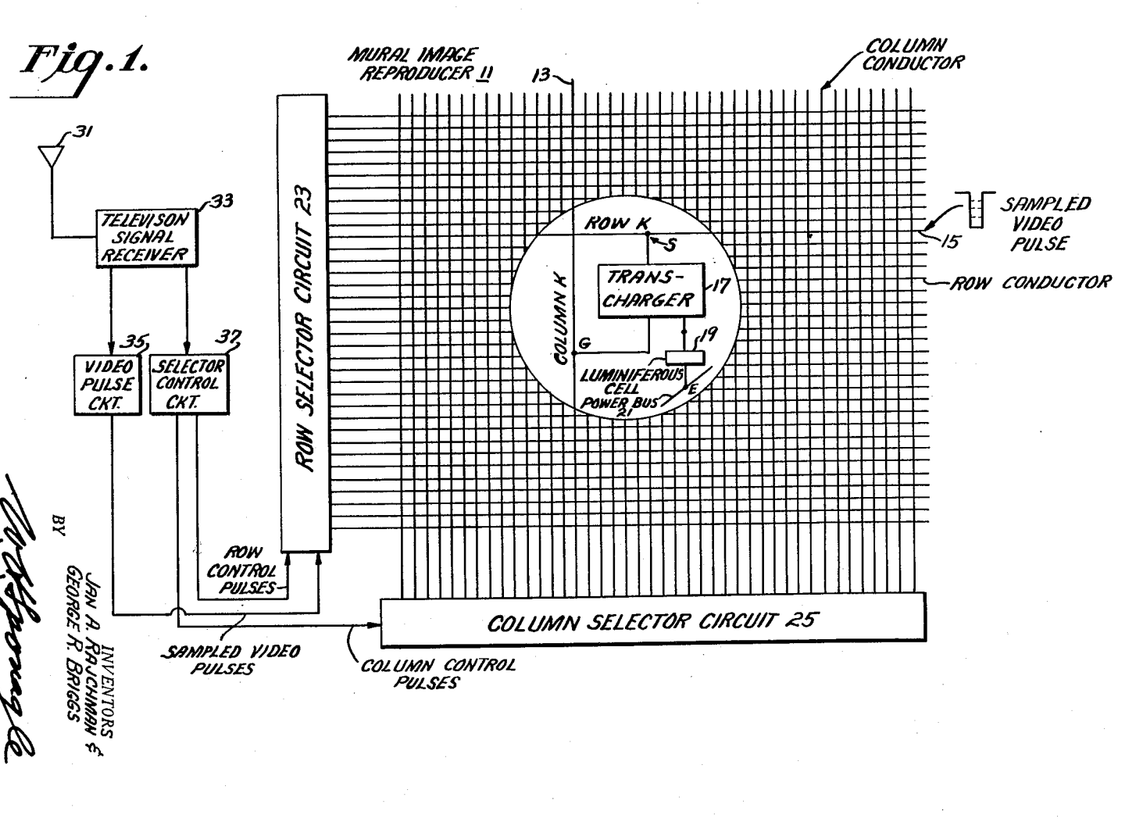
FIGURE 1 shows a block diagram of one form of the present invention.

FIGURE 1 shows a block diagram of one form of the present invention. Included in the block diagram is a mural image reproducer 11. The mural image reproducer 11 consist of rows and columns of conductors which are arrayed contiguously to form a frame of geometric shape. At, for example, the intersection of column conductor $k13$ and row conductor $k15$, a transcharger 17 is installed which is coupled to the point S on row $k15$ and the point G on column $k13$. The transcharger 17 selects row and column image information which is applied to it. Responsive to the image information pulses corresponding to that elemental areas, the transcharger 17 then controls the light output from an electroluminescent cell 19. The electroluminescent cell 19 is also coupled to the point E on the power bus 21 which is common to all of the intersections of the rows and columns. The various rows of the mural image reproducer 11 are selected by the row selector circuit 23; the columns of the image reproducer 11 are selected by the column selector circuit 25. In one form of the invention, the image information pulses are applied to the row selector circuit, to be transmitted on each row conductor as that row conductor is selected. Alternatively the image information pulses can be applied to the column selector circuit 25 for application to a selected column conductor.

If the mural image reproducer 11 is to be used for reproducing television images, then the transcharger 17 controlling each elemental area will select the video information relating to that area and control the light output from the electroluminescent cell 19 accordingly.

It is to be appreciated that to reproduce a television image transmitted according to U.S. Standards of 525 lines, the mural image reproducer 11 may employ typically 525 rows and about 700 columns.

The mural image reproducer 11 in FIGURE 1, for television image reproduction, will employ a proper selection of rows, say, row 1, row 3, row 5 . . . and row 2, row 4, row 6 . . . for every frame as in an interlaced scanning scheme. For applications other than television applications, the selection of rows and columns are dependent upon the particular application involved. For radar or PPI (point position indicator) systems, the mural image reproducer 11 may consist of actually only a single long row which is spirally assembled to form a substantially circular pattern reproducing device or may be assembled with rows and columns whereby the columns will provide information along a radius in a circular trace indicator and the rows will provide information along the azimuth of the circular trace indicator.

The transcharger 17 is responsive to the coincidence of area location and video signal information at the intersection of columns and rows. The coincidence of these signals at each intersection will cause the transcharger 17 to deliver corresponding video information to an associated electroluminescent cell 19. The transcharger 17 is a signal-coincidence switch, as will be shown. It also has the property of being able to store the video or pattern information relating to the intersection to control the light output from the associated electroluminescent cell 19 indefinitely.

Figure 2:
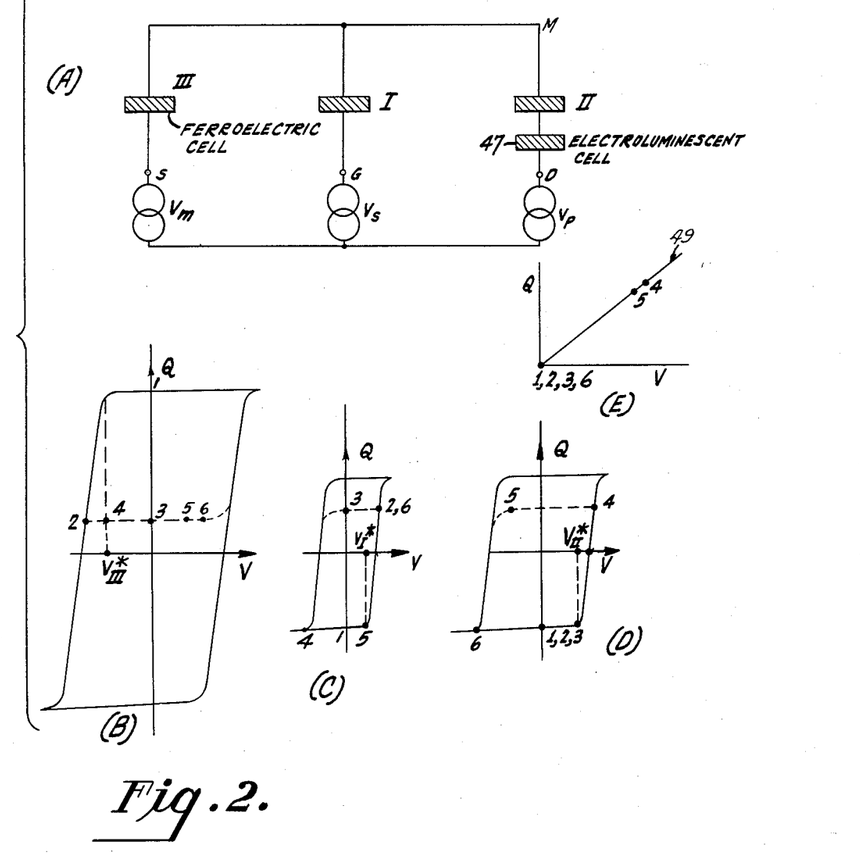
FIGURE 2a shows a transcharger.
FIGURES 2b, 2c, and 2d illustrate hysteresis curves relating to the ferroelectric cells of a transcharger.
Figure 3:
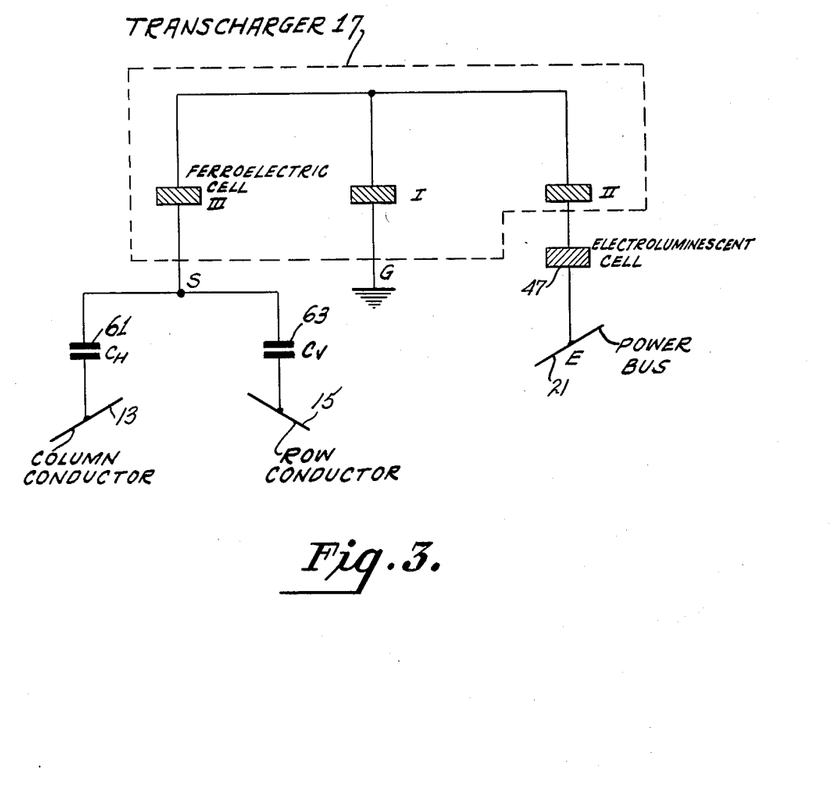
FIGURE 3 shows another method of connecting a transcharger.

The transcharger 17 shown in FIGURE 3 includes three ferroelectric cells I, II, and III. These ferroelectric cells may be constructed typically of such materials as $BaTiO_3$. Ferroelectric materials of this type have the properties of saturation and remanence characteristics which enable them to function as transhysteretic devices when grouped as an aggregate of the form shown in FIGURE 2a. The transcharger is utilized for controlling indefinitely a flow of alternating electric power according to a single electric pulse setting. For an extensive description of the aggregate of ferroelectric devices in the form referred to as transchargers, see the copending application by the present inventors bearing the title "Ferroelectric Systems," U.S. Serial No. 511,915, now Patent 2,900,622 issued August 18, 1959.

The operation of the transcharger 17 may be described as follows:

The ferroelectric cells I, II, and III have coercive voltages $V_I$, $V_{II}$, and $V_{III}$ of increasing value, that is, $V_I$ is the smallest and $V_{III}$ is the largest as is shown by the idealized hysteresis loops of these cells which are shown respectively in FIGURES 2c, 2d and 2b. The remanent charge Q of ferroelectric cell III is equal to or large than the sum of the equal remanent charges of the ferroelectric cells I and II. An electroluminescent cell 47 is in series with the ferroelectric cell II and may be considered for all practical purposes to be a pure capacitance represented by a straight line 49 on a Q—V plot. One terminal of each of the ferroelectric cells I, II, and III is connected to the common terminal M. It is noted from FIGURE 2a that the opposing terminals of the ferroelectric cells I and III are connected to terminals G and S which have been described in connection with, for example, column $k13$ and row $k15$ of FIGURE 1.

The operation of the form of the transcharger shown in FIGURE 2a is as follows: let the voltage source $V_m$ supply a large positive pulse which polarizes the ferroelectric cells as indicated by the points 1 in FIGURES 2b, c, and d. The voltages of all cells are measured from point M for convenience. The cells I and II are now "blocked," i.e., no flow of charge results from applying an alternating voltage $V_p$ of moderate amplitude to the point D, since either cell I or II is saturated in the direction in which there is a tendency for charge to change. With $V_p$ returned to zero, next apply a negative pulse $-V_m$ which does not exceed the value $(V_{III}^* + V_I^*)$ where, $V_I^*$, $V_{II}^*$, and $V_{III}^*$ refer to voltages corresponding to the "knees" of the corresponding hysteresis curves of ferroelectric cells I, II, and III. Again no flow of charge will occur because the voltage required to cause switching in the path made up of cells III and I has not been exceeded. The minimum voltage required to cause switching in the path made up of cells III and II has also not been exceeded because $V_{II}^*$ is greater than $V_I^*$. With $V_m$ zero, a positive voltage $V_s$ of the same magnitude $(V_{III}^* + V_I^*)$ can be applied to point D without causing switching of cells I and III, and switching around the path made up of cells I and II is prevented because one of these cells is already saturated in the direction of the applied field. Thus application of restricted amplitude voltage to either points S or G has no effect.

If voltages $V_m$ and $V_s$ are applied simultaneously, however, their sum may be sufficient to cause switching around the path made up of cells I and III. In particular, if $V_s = V_I^* + V_{III}^*$, then for any value of $V_m$ less than zero some switching will occur around this path. If the hysteresis loops of the cells are not perfect but have finite slopes in the switching regions as indicated in FIGURE 2, then the amount of switching will depend on the magnitude of $V_m$; in particular $V_m$ may be of such a value to cause switching to point 2 on each loop. Upon the termination of $V_s$ and $V_m$, the cells will be in the state indicated by point 3. If now the alternating voltage $V_p$ is applied, the cells I and II can be switched because the polarizations are not completely opposed. When $V_p$ is in its positive phase nothing happens until this voltage exceeds $V_{II}^* + V_I^*$ (it is assumed that the knee of the minor loop of cell I originating at point 3 has the same voltage $V_I$ as the knee of the major loop), but then cells I and II start to switch to the points 4. The negative voltage apearing across cell I also appears across cell III, but if $V_p$ is limited so that the maximum voltage appearing across cell I at point 4 is less than the coercive voltage of cell III, no switching of cell III can occur. During this process the voltage across the electroluminescent cell 47, which can electrically be considered as a capacitance, is dropped to the same voltage, as shown by the point 4 on the Q—V plot (FIGURE 2e). During the charging of the electroluminescent cell 47 a changing electric field causes light to be produced. At the termination of the positive pulse $V_p$, a small amount of charge flows out of the electroluminescent cell 47 back through cells I and II due to the lack of perfect rectangularity of the loop of the ferroelectric material, and point 5 is reached. The voltage left on the electroluminescent cell 47 cannot exceed $V_I^* + V_{III}^*$, otherwise cells I and II will be partially switched back again.

During the negative phase of the alternating voltage $V_p$, cells I and II are switched to points 6 if $V_p$ is large enough in magnitude and the charge in the electroluminescent cell 47 is removed. While the capacitive type electroluminescent cell 47 is charging, another light energizing pulse $V_p$ is produced. The voltage appearing across cell III is now in the direction to switch this cell, but since this coercive voltage of cell I is less than the coercive voltage of cell III, cell I will absorb all the available charge of cell II before cell III has a chance to switch.

The next positive phase of $V_p$ will switch cells I and II again and charge the electroluminescent cell 47 to points 5 as before, producing another light pulse. The next negative phase will return the device to the points 6 producing further light, etc. Light will continue to be produced while the device is being energized by the voltage $V_p$. The amount of light produced by the electroluminescent cell 47 increases with increasing peak cell voltage. As the peak cell voltage in turn increases, the amount of charge exchanged between cells I and II becomes larger. This charge is equal to the change of charge introduced in cell I via cell III during the initial setting process; this charge depends upon the magnitude of the setting pulse $V_m$. Thus the amount of light increases with decreasing $V_m$, ($V_m$ is a voltage having negative polarity) to some maximum value determined by the saturation Q of cells I and II. A definite threshold of light production also exists because it is found that the electroluminescent cell produces no light if the peak voltage across it is less than a certain value. It is therefore possible to control the light output from zero to some maximum value by varying the magnitude of $V_m$. If $V_m$ is applied simultaneously with a pulse of fixed magnitude $V_s$, light can be produced, but if $V_s$ alone or $V_m$ alone is applied to the device no charge exchange can occur and no light can be produced. Thus the coincidence between $V_s$ and $V_m$, with $V_s$ typically acting as a threshold pulse serves to select the proper image or pattern cell of the display device, and video information corresponding to $V_m$ is impressed upon the selected cell.

Once a transcharger has been set to produce a certain light output, the light output can be reduced conveniently by first reblocking cells I and II. This is conveniently done by applying a large positive $V_m$ ($V_s$ maintained equal to zero during this process), and returning the cells to the points 1 shown in FIGURE 2. This operation is performed just before the cell is to be selected for new video information. Since $V_m$ only is used for blocking, blocking of a whole row of elements must be done at the same time. This function of blocking is performed just before the selected row is to be scanned by the column selector 25. To make certain that cells I and II can be placed in the states represented by points 1, regardless of their original orientation by the blocking pulse, the sum of the maximum charges required to switch these cells completely must be capable of being supplied by switching cell III. If the remanent charges of cells I and II are equal, the remanent charge of cell III must be equal to or larger than twice the remanent charge of cell I or II.

In the blocked state, no flow of charge can occur when $V_p$ is applied to the device, as long as the positive phase of $V_p$ is limited in amplitude. If $V_p$ is limited in this phase to less than $V_{III}^* + V_{II}^*$ no switching around the path composed of cells II and III can occur. This consideration places a limit on the amount of light which can be produced during the positive phase of $V_p$ when the transcharger is unblocked, but this can be compensated for by the increased light obtained by driving the transcharger with a larger amplitude negative phase of $V_p$. There is no limit imposed on the amplitude of the negative phase of this voltage.

In the image reproducer of the type using the transcharger 17 shown in FIGURE 2a, the setting of each transcharger is obtained typically, by linear addition of an image or pattern information pulses provided on a row conductor and a column scanning pulse. Each of these pulses has an amplitude which is below the setting threshold of the transcharger and is insufficient by itself to produce any setting. The setting depends upon the precise value of the sum of the pulses.

The linear addition of the image or pattern pulses and the column scanning pulse can also be obtained by means of condenser couplings as shown in FIGURE 3. The condenser 61 is coupled between the terminal S and the column conductor 13. The condenser 63 is coupled between the terminal S and the row conductor 15. The terminal G is connected to ground. The image pulses and the row scanning pulses which are applied concomitantly to the column and row conductors 13 and 15 are of the same polarity. The terminal S thereupon assumes the average value of these pulses, the averaging being determined by the magnitudes of the capacitance of the condensers 61 and 63.

It is possible to take the average of more than two applied pulses. For example, in a row of transchargers, the points 5 can be connected to a video or pattern signal bus common to all elements in the row. The column and row conductors 13 and 15 will be made to carry scanning pulses of fixed amplitudes whose sum is sufficient to reach the threshold of setting of each transcharger at the proper time. The video or pattern signal applied to the common bus would then cause the sum of the three signals, namely the video signal and the column and row conductor signals, to exceed the threshold of the scanning element and of that element only to an extent determined by the video pulse.

Figure 4:
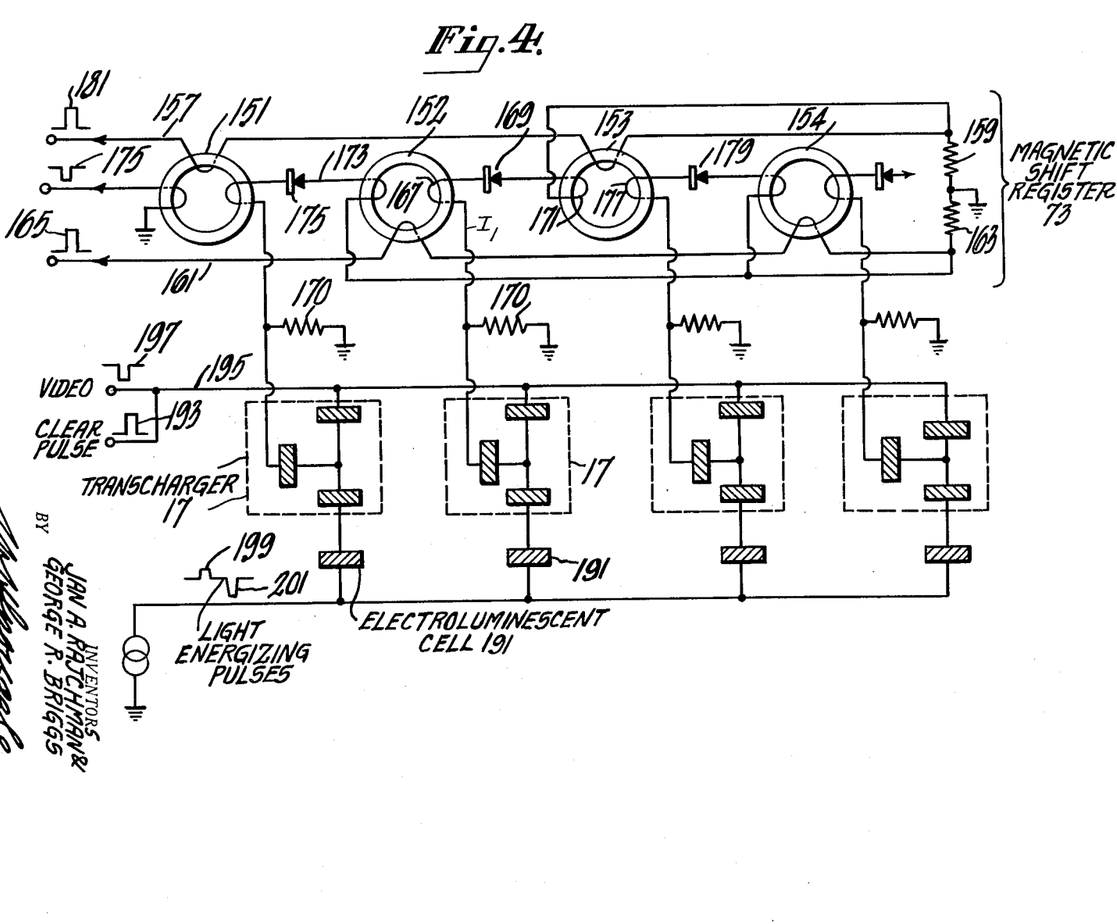
FIGURE 4 shows a schematic diagram of a row of transchargers and electroluminescent cells actuated by a magnetic shift register.

FIGURE 4 shows a schematic diagram of a row of transchargers which are controlled or scanned by a magnetic shift register 73. The magnetic shift register 73 shown in FIGURE 4 illustrates one type of column selector circuit which may be utilized in an image reproducer. The particular magnetic shift register 73 illustrated is a switching circuit of unusual reliabilty and positive action and has been descrbed in detail in the copending application U.S. Serial No. 512,056, by Rajchman, Briggs and Lo, now abandoned, bearing the title "Magnetic Systems."

FIGURE 4 shows each of the element transchargers 17 coupled to an electroluminescent cell 191. During the scanning of a row as represented in the circuit shown in FIGURE 4, the magnetic shift register is utilized to set each element transcharger to a threshold level at a rate and sequence corresponding to the scanning of that line.

Figure 5:
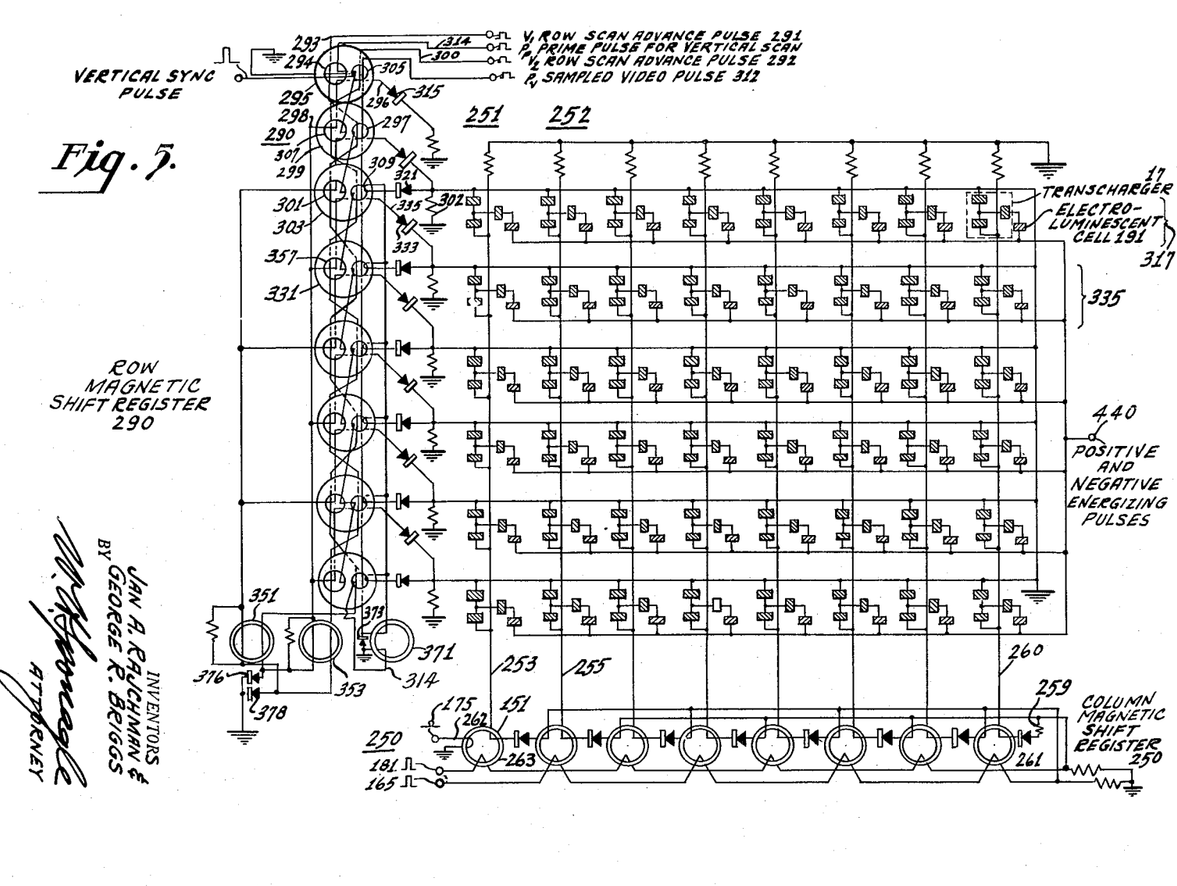
FIGURE 5 illustrates a schematic diagram of several rows and columns of a mural image reproducer utilizing transchargers and including the row and column selector circuits.

The circuit shown in FIGURE 5 illustrates another method of utilizing a magnetic shift register to supply video information to each of the rows of transchargers light cells utilizing principles described in the copending application by Rajchman, Briggs and Lo, entitled "Electric Control Systems," U.S. Serial No. 511,916, now Patent 2,803,812 issued August 20, 1957. In a true mural image reproducing system a multiplicity of rows are utilized, with the total number of rows bearing a prescribed relationship to the lines of the conventional type of display raster. In addition, the number of elemental areas along each row must be in accord with the image definition required of the image reproducer and with the aspect ratio which is characteristic of the transmitted image.

FIGURE 5 shows a schematic diagram of a mural image reproducer utilizing one transcharger per elemental light emitting area, and which utilizes a column selector circuit and a row selector circuit including magnetic devices, hereinafter referred to as transfluxors, for not only selecting the row to be scanned but also to supply the video information pulses and the clearing pulses to that row. It is to be understood that the use of the particular type of row and column selector circuits shown in FIGURE 5 is intended to illustrate only one means for performing these functions. The circuits to be described, however, are reliable, dependable and accurate. The column selector circuit is a magnetic shift register 250 of the type shown in FIGURE 4 which successively switches threshold setting pulses to each column conductor starting with the first column conductor 253 and continuing until the last column conductor 260 is reached. The successively generated pulses 181 and 165 are applied to the array of cores in the column magnetic shift register shown in FIGURE 4 and the transchargers 17 are successively "set to threshold" along, for example, the column conductor 253, then the column conductor 255, and so on. The resistor 259 is a load for the last core 261, replacing the core load present in the other stages.

The row selector circuit of the mural image reproducer shown in FIGURE 5 is in the form of a row magnetic shift register 290. The row magnetic shift register performs the function of applying clearing pulses to each row and also supplying the video pulse information to the proper row during the scanning process. The video signal is commutatively distributed by the row magnetic shift register 290. To accomplish this function the row magnetic shift register utilizes transfluxors rather than cores. The transfluxor comprises a core of a magnetic material such as a molded ceramic ferrospinel which has a rectangular hysteresis loop and consequently a remanent induction substantially equal to the saturation induction. A simplified description of the operation of the transfluxor is described in detail in the copending application by Rajchman bearing the title "Magnetic Systems" and bearing the U.S. Serial No. 473,709.

The operation of the transfluxor 233 is analogous to the operation of the transcharger 17 shown in FIGURE 2. This is due to the fact that both transfluxor and transcharger are hysteretic devices and are subject to control by setting, priming and driving pulses or to any succession of pulses which controls the states of flux or charge in the device to provide control of power or energy reaching an output load.

The mural image reproducer shown in FIGURE 5 shows only a small number of the transcharger and electroluminescent cells required for a television system which can reproduce all of the video information with full detail corresponding to a 525 line picture. It is recognized, however, that the number of rows and columns and the number of switching sequences in both the row and column magnetic shift registers may be increased without detracting from the teachings of the present invention.

The present invention may be utilized to display color images or patterns by utilizing elemental areas of electroluminescent cells which provide light of required primary colors. For example, if each of the rows of the previously described mural image reproducer shown in FIGURE 5 is constructed to include subrows of electroluminescent cells for providing light output of each of three component colors, say, red, green and blue, video or pattern information correspoding to each of the component colors provided to the corresponding electroluminescent cell at the proper time will provide a picture in full color.

Figure 6:
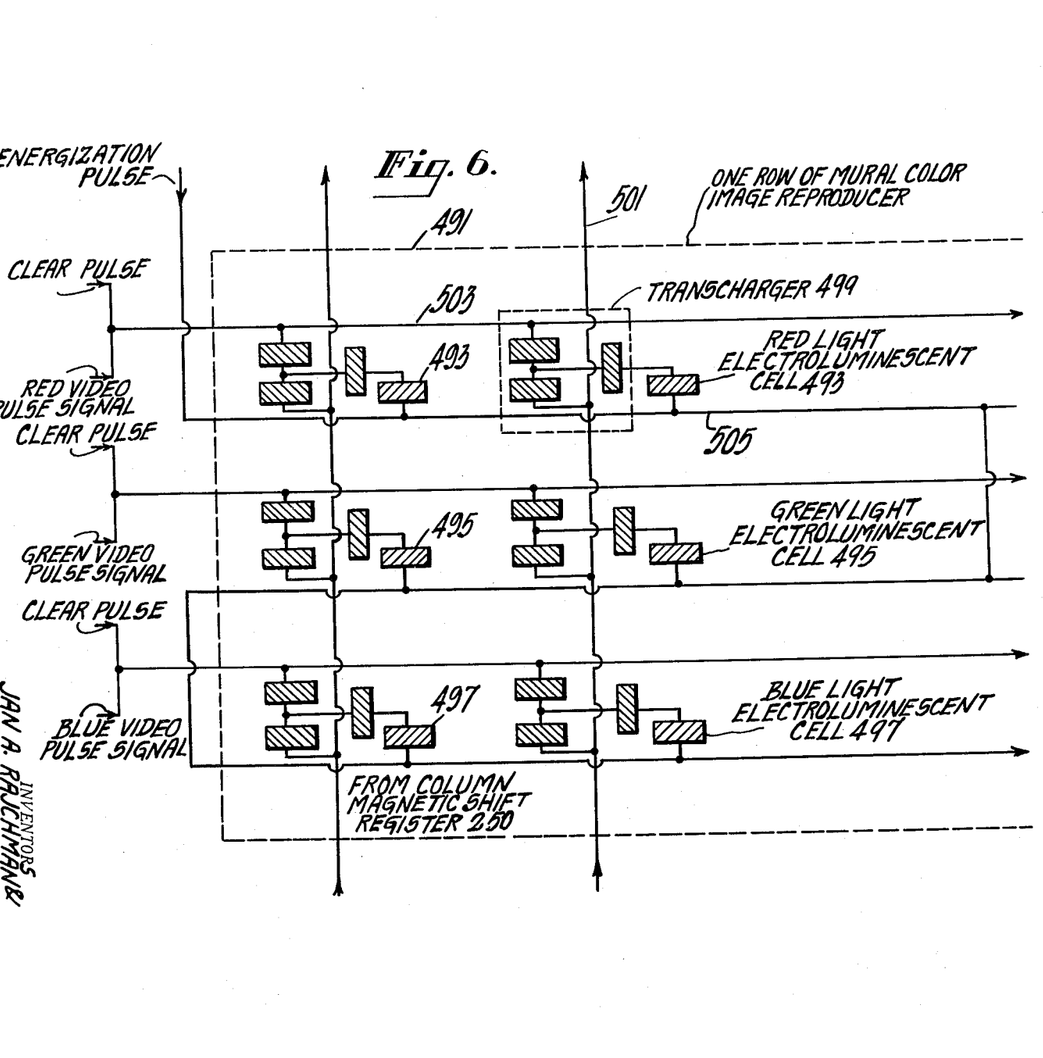
FIGURE 6 illustrates a schematic diagram of a section of an image reproducer utilizing transchargers which may be used for reproducing color images.

FIGURE 6 shows one section of a row of a typical mural color image reproducer utilizing the present invention. This section is boxed in the dotted line bearing the numeral 491. This row of the mural color image reproducer actually consists of three lines. One bus 505 supplies energizing information to the red light electroluminescent cells 493; this bus supplies energizing information to the green light electroluminescent cells 495; bus 505 also supplies energizing information to the blue light electroluminescent cells 497. The red light electroluminescent cell 493, for example, is controlled by the transcharger 499 which in turn is controlled by the threshold setting pulse provided by the bus 501 from the column magnetic shift register 250, and clear pulses and red pulse signals from the bus 503, and energization pulses from the bus 505. Each of the subrows shown in FIGURE 6 functions in the same manner as the rows shown in FIGURE 5. The television signal receiver operating in conjunction with the mural color image reproducer must demodulate an incoming color television signal and produce pulses or signals relating to each of the component colors.

The circuit shown in FIGURE 6 illustrates the various tranchargers involved as being arrayed substantially in columns. It is to be appreciated, however, that the transchargers with their associated electroluminescent cells may be staggered according to prescribed orientations and may be, for example, sequentially energized to accomplish line sequential representation of color information, i.e., one entire subrow in a row could be energized followed by the successive energizing and scanning of the other subrows.

Figure 7:
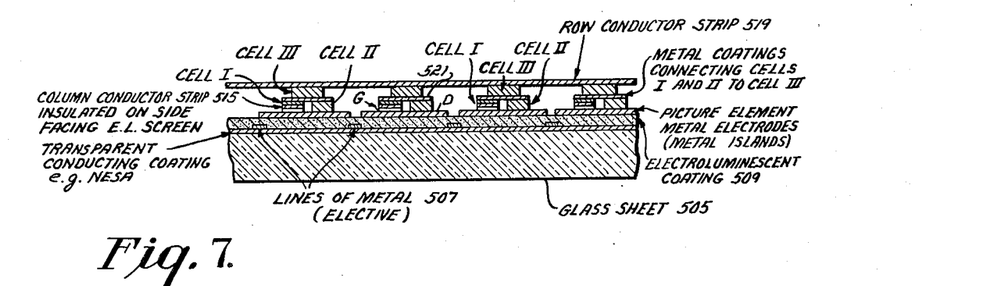
FIGURES 7 and 8 illustrate constructional details of a section of an image reproducer utilized in the present invention.
Figure 8:
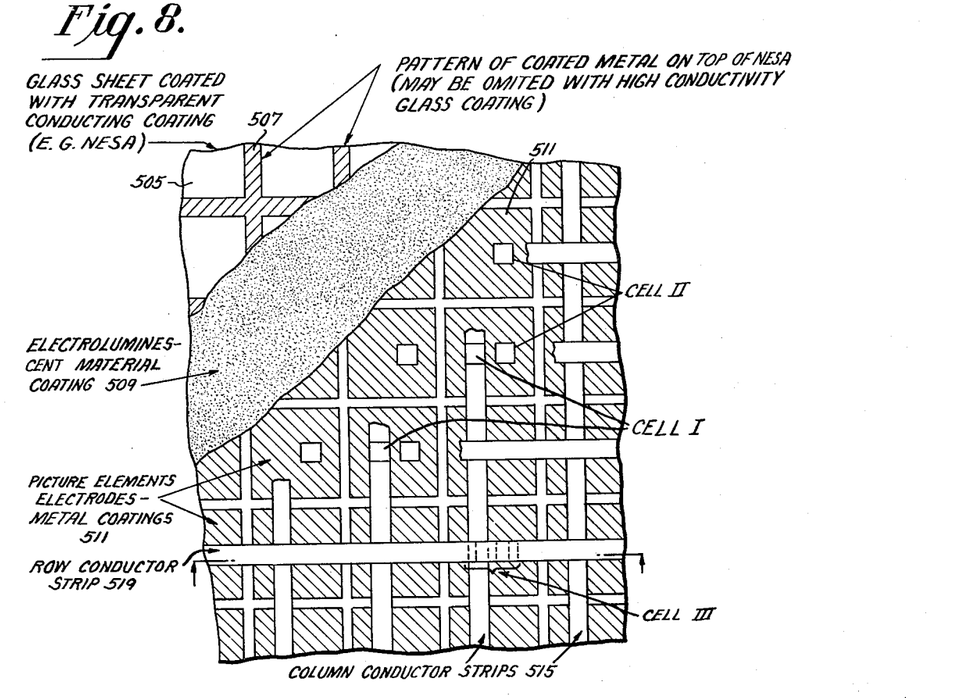

FIGURES 7 and 8 illustrate one method of construction of the mural image reproducer of the present invention. A glass sheet 505, the size of the desired resultant picture or pattern, is coated with a transparent conductive coating such as Nesa or tin chloride. A pattern of metal lines 507 may be coated on top of the glass coating so as to "frame" each picture element. The glass sheet 505 with the transparent and metal pattern coatings is thereupon coated with a layer of electroluminescent material 509, such as activated zinc sulphide powder suspended in a plastic dielectric such as araldite or krylon. A mosaic of square metal islands 511 is then coated on top of the electroluminescent layer 509 to form electrodes for the individual picture elements. On top of each square metal island 511, a ferroelectric cell is attached. This is ferroelectric cell II, hereinafter referred to as cell II, and may be considered as the ferroelectric cell for controlling the electroluminescent cell. These ferroelectric cells can be made, for example, by using $BaTiO_3$ in single or polycrystalline form. The square metal island is one of the electrodes of cell II; in another form of the invention, the cell II may be coated with metal electrodes before it is attached to the array. The column conductor strips 515 are installed on the array, utilizing an insulating layer G between these column conductor strips 515 and the square metal islands. Ferroelectric cells I, hereinafter referred to as cells I, are thereupon installed as shown on the column conductor strips 515 such that both cells I and II respectively have the same height above the glass surface. A ferroelectric cell III, hereinafter referred to as cell III, is electrically connected to the top surface of cells I and II. Finally, row conductor strips 519 are arrayed with ferroelectric cells III spaced between the column conductor strips 515 and the row conductor strips 519 as shown in FIGURES 7 and 8. The ferroelectric cells III, referred to as cells III, are spaced a picture element apart. Cell III has a larger area than either cell I and II and actually spans over cells I and II. The aforementioned electrical connection between cells I, II and III consists of a metal electrode 521 constructed between cells I and II and cell III. This metal electrode may be fabricated by metal coating cells I, II and III in advance and then soldering the cells together.

It follows from the construction described above that cell II is thicker than cell I; this is desirable since cell I is to have a lower coercive voltage than cell II. Also cell III has a larger area than cells I and II since the charge carried through cell III is the sum of the charges carried through I and II. A typical set of dimensions associated with the structure shown in FGURES 7 and 8, may be as follows, for example: The picture elements are .100 inch apart for a television picture having 525 lines; this spacing would lead to an image approximately 4½′ by 6′. The glass sheet of that size is from ⅛″ to ¼″ thick. The conductive transparent coating is very thin, about a fraction of a 1000th of an inch, and the electroluminescent layer is approximately 1 mil (.001″) thick. The metal islands, which are approximately 0.90″ square, are from 2 to 5 mils thick. The ferroelectric crystals required to drive elements of this capacity are very small, on the order of magnitude of from .004″ to .20″ on a side and from .001 to .01″ thick. The metal strips for the row and column conductors have substantially the width of the ferroelectric crystals.

There are several advantages of using transchargers as switching, control and storage elements in an image reproducer of the present invention.

A. The transcharger is a "voltage" device rather than a "current" device and its effective impedance is higher, therefore it is easier to obtain the relatively high voltages required for effective light output from electroluminescent cells.

B. The fabrication of transchargers is relatively easy as the ferroelectric cells are either attached to V or H lines or else to the surface of the array itself. No components other than the ferroelectric cells and their associated connections are required.

C. The dead storage of a latent picture using transchargers can be indefinitely long, such as is the case with transfluxors, i.e., once the transhysteretic devices have been set by scanning through the frame, the setting will remain unaltered indefinitely without any holding power. When the light energizing A.-C. power is applied, the stored latent picture becomes visible and can be viewed indefinitely.

D. The present device can be used not only for television display but to display other information—for example, information from radar. The storage capabilities of transhysteretic devices are particularly advantageous in this case. Another important application of the invention is for the display of the output of a computer.

In these two applications and others the "scanning" may not be repetitive; various picture elements may be set in arbitrary order. In other words, the transhystereticdriven display devices have what is often called "random access" which means that access to any preselected position can be obtained at will at any time without regard to previous accesses or to any address searching schedule.

E. It is also obvious that the discrete electroluminescent elements need not be arranged in a rectangular array but may be arranged on a cylinder, sphere, or any other surface. The density of elements need not be constant, but can vary according to any desired distribution.

What is claimed is:

1. Electroluminescent apparatus comprising a plurality of ferroelectric cells, an electroluminescent cell, a source of power, a source of control signals, means for operatively connecting said ferroelectric cells and said electroluminescent cell between said source of power and said source of control signals for controlling the light emitted from said electroluminescent cell in response to said control signals.

2. Electroluminescent apparatus comprising a trio of ferroelectric cells each having first and second terminals, means for coupling said first terminal of each of said ferroelectric cells in common, a power source, an electroluminescent cell, means for coupling said electroluminescent cell between said power source and the second terminal of the first of said ferroelectric cells of said trio, means for applying control and switching signals to the second terminals of both said second and third ferroelectric cells of said trio to control the power passing through the first of said ferroelectric cells and said electroluminescent material.

3. Electroluminescent apparatus comprising a trio of ferroelectric cells each having a first and second terminal with each of the second terminals of said trio connected together, a fixed potential terminal, means for coupling the first terminal of the first cell of said trio to said fixed potential terminal, a power source and an electroluminescent cell serially connected between said fixed potential terminal and the first terminal of the second cell of said trio, a source of switching and control signals, condenser means, means for serially connecting said condenser means and said source of switching and control signals between said fixed potential terminal and the first terminal of the third of said cells of the said trio.

4. Electroluminescent apparatus comprising a sheet of transparent material, said sheet having a conductive transparent coating on one surface, a layer of electroluminescent material on said conductive coating, a mosaic of columns and rows of metallic islands on said layer of electroluminescent material, a set of column and row conductors, and ferroelectric material between said column and row conductors and said metallic islands in an arrangement to provide a transcharger at each island.

5. Electroluminescent apparatus comprising a sheet of transparent material, a transparent first layer of relatively low electrical conductivity coating said sheet, a metal second layer of relatively high electrical conductivity superposed on said first layer in a pattern partially covering said first layer, and a third layer of electroluminescent material on said first and second layers.

6. Electroluminescent apparatus comprising a sheet of transparent material, a transparent first layer of relatively low electrical conductivity coating said sheet, a metallic second layer of relatively high electrical conductivity superposed on said first layer in a pattern partially covering said first layer, a layer of electroluminescent material on said first and second layers, a set of column and row conductors located in predetermined alignment with said pattern, means including ferroelectric materials between said column and row conductors and selected areas of said second layer in arrangement to provide a ferroelectric control and storage device at each of said selected areas.

References Cited in the file of this patent

UNITED STATES PATENTS

| | | |
|---|---|---|
| 2,796,584 | Hurvitz | June 18, 1957 |
| 2,798,823 | Harper | July 9, 1957 |
| 2,810,883 | Carnine | Oct. 22, 1957 |
| 2,813,223 | Kalfaian | Nov. 12, 1957 |
| 2,837,661 | Orthuber et al. | June 3, 1958 |
| 2,875,380 | Toulon | Feb. 24, 1959 |
| 2,922,076 | Sack et al. | Jan. 19, 1960 |